US012798025B2

(12) United States Patent
Bird

(10) Patent No.: US 12,798,025 B2
(45) Date of Patent: Nov. 17, 2026

(54) MULTI-AXIS APPARATUS FOR A TOOLHEAD AND A METHOD TO USE THE SAME

(71) Applicant: Joshua Yong-Jing Bird, Mountain View, CA (US)

(72) Inventor: Joshua Yong-Jing Bird, Mountain View, CA (US)

( * ) Notice: Subject to any disclaimer, the term of this patent is extended or adjusted under 35 U.S.C. 154(b) by 0 days.

(21) Appl. No.: 19/188,990

(22) Filed: Apr. 24, 2025

(65) Prior Publication Data

US 2026/0151865 A1 Jun. 4, 2026

Related U.S. Application Data

(60) Provisional application No. 63/727,198, filed on Dec. 3, 2024.

(51) Int. Cl.

| | |
|---|---|
| ***B23Q 1/48*** | (2006.01) |
| ***B25J 9/02*** | (2006.01) |
| ***B25J 9/10*** | (2006.01) |
| ***B29C 64/236*** | (2017.01) |
| ***B33Y 30/00*** | (2015.01) |

(52) U.S. Cl.

CPC ............ *B23Q 1/4852* (2013.01); *B25J 9/023* (2013.01); *B25J 9/104* (2013.01); *B29C 64/236* (2017.08); *B33Y 30/00* (2014.12)

(58) Field of Classification Search

CPC ...... B23Q 1/4852; B29C 64/236; B25J 9/023; B25J 9/104; B33Y 30/00

USPC ........................................................ 74/490.04

See application file for complete search history.

(56) References Cited

U.S. PATENT DOCUMENTS 3,209,653 A * 10/1965 Satre ........................ B41D 5/00 409/192

2016/0136886 A1* 5/2016 Jeong .................... B29C 64/232 425/375

OTHER PUBLICATIONS

"Polar Bear Printer", https://github.com/kadirilkimen/Polar-Bear-Cnc-Machine?tab=readme-ov-file, 7 pgs.

"Novel 4-Axis 3D Printing Process to Print Overhangs Without Support Material", found at https://link.springer.com/chapter/10.1007/978-3-030-54334-1 10, 35 pgs.

* cited by examiner

*Primary Examiner* — T. Scott Fix

(74) *Attorney, Agent, or Firm* — HAYES SOLOWAY P.C.

(57) ABSTRACT

A multi-axis motion system for a toolhead has a linear rail positioned between at least two drivable pullies. A flexible belt is positioned in contact with each of the at least two drivable pullies and is positioned along a belt path of the linear rail. A toolhead is attached to an end portion of the linear rail and the toolhead is rotatable about a first axis. The first axis is formed substantially perpendicular to an elongated axis of the linear rail. Rotation of the toolhead about the first axis is controlled by activation of one drivable pulley of the at least two drivable pulleys.

13 Claims, 11 Drawing Sheets

MULTI-AXIS APPARATUS FOR A TOOLHEAD AND A METHOD TO USE THE SAME

CROSS REFERENCE TO RELATED APPLICATION

This application claims benefit of U.S. Provisional Application Ser. No. 63/727,198 filed Dec. 3, 2024, the entire disclosure of which is incorporated herein by reference.

FIELD OF THE DISCLOSURE

The present disclosure is generally related to machine manufacturing and more particularly is related to multi-axis apparatuses for a toolhead and methods to use the same.

BACKGROUND OF THE DISCLOSURE

Additive and subtractive manufacturing has found uses in several industries and has now become accessible for consumer use. Additive manufacturing machines such as 3D-printers are widely available and are becoming increasingly popular for both consumer use for at-home manufacturing, and for industrial use to streamline and simplify production.

Additive manufacturing enables the creation of custom and bespoke designs and parts with relative ease and minimal fabrication knowledge. Complex designs can be designed using computer aided design (CAD) and then physically created by additive manufacturing machines. These complex designs may have complex geometries, such as overhangs, that may be prone to machine error. These errors can be caused by poor object adhesion to the bed when creating complex objects or from the general inability to create objects with floating components, e.g., components which lack a physical support immediately underneath them. Current additive manufacturing machines are able to create highly complex geometries that are otherwise difficult to create or unobtainable by conventional fabrication methods, yet they still suffer from certain limitations, including limitations with creating complex geometries.

Subtractive manufacturing, including the use of computerized numerical control (CNC) devices for milling, routing, or other material processing have been used in industrial applications for several years. Increasing consumer interest in home fabrication and design has driven the development of "desktop" CNC machines. However, these machines are still highly cost prohibitive and are highly complex with several moving parts, thus leaving them out of reach from the general public. A certain degree of engineering expertise is still required to operate small form factor CNC machines. Other robotic arm operations, such as welding, printed circuit board construction, and the like still remain out of reach from the general public. Custom welds and printed circuit boards still require a user to gain the assistance of an expert or requires one to learn specific fabrication and construction methods. Generally, manufacturing by CNC or robotic arm requires a user to custom order a specified or created design and is often done at a high cost based on raw materials, labor, and overhead to operate such machinery.

SUMMARY OF THE DISCLOSURE

Embodiments of the present disclosure provide a system and method for a multi-axis motion system for a toolhead. Briefly described, in architecture, one example of the system, among others, can be implemented as follows. A multi-axis motion system for a toolhead has a linear rail positioned between a at least two drivable pullies. A flexible belt is positioned in contact with each of the at least two drivable pullies and is positioned along a belt path of the linear rail. A toolhead is attached to an end portion of the linear rail. The toolhead is rotatable about a first axis and the first axis is formed substantially perpendicular to an elongated axis of the linear rail. A rotation of the toolhead about the first axis is controlled by activation of one drivable pulley of the at least two drivable pullies.

The present disclosure can also be viewed as providing methods for multi-axis motion of a toolhead. In this regard, one example of such a method, among others, can be broadly summarized by the following steps: positioning a flexible belt along a path of a linear rail, wherein the linear rail is positioned between a first drivable pulley and a second drivable pulley; and rotating a toolhead about a first axis by driving the flexible belt by at least one of the first or second drivable pulley, wherein the first axis is formed substantially perpendicular to an elongated axis of the linear rail.

The present disclosure can also be viewed as providing a system and method for multi-axis motion of a toolhead. In this regard, one example of the system, among others, can be implemented as follows. A multi-axis motion system for a toolhead has a first linear rail positioned between a first drivable pulley and a second drivable pulley. A flexible belt is positioned in contact with each of the first and second drivable pulley and is positioned along a belt path of the first linear rail. A second linear rail is positioned perpendicular to the first linear rail, where the first linear rail is moveable along at least a portion of a length of the second linear rail. A toolhead is attached to an end portion of the first linear rail. The toolhead is rotatable about a first axis, the first axis formed substantially perpendicular to an elongated axis of the first linear rail and the second linear rail. A rotation of the toolhead about the first axis and translational movement of the first linear rail along the elongated axis is controlled by activation of one of the first and second drivable pulley.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
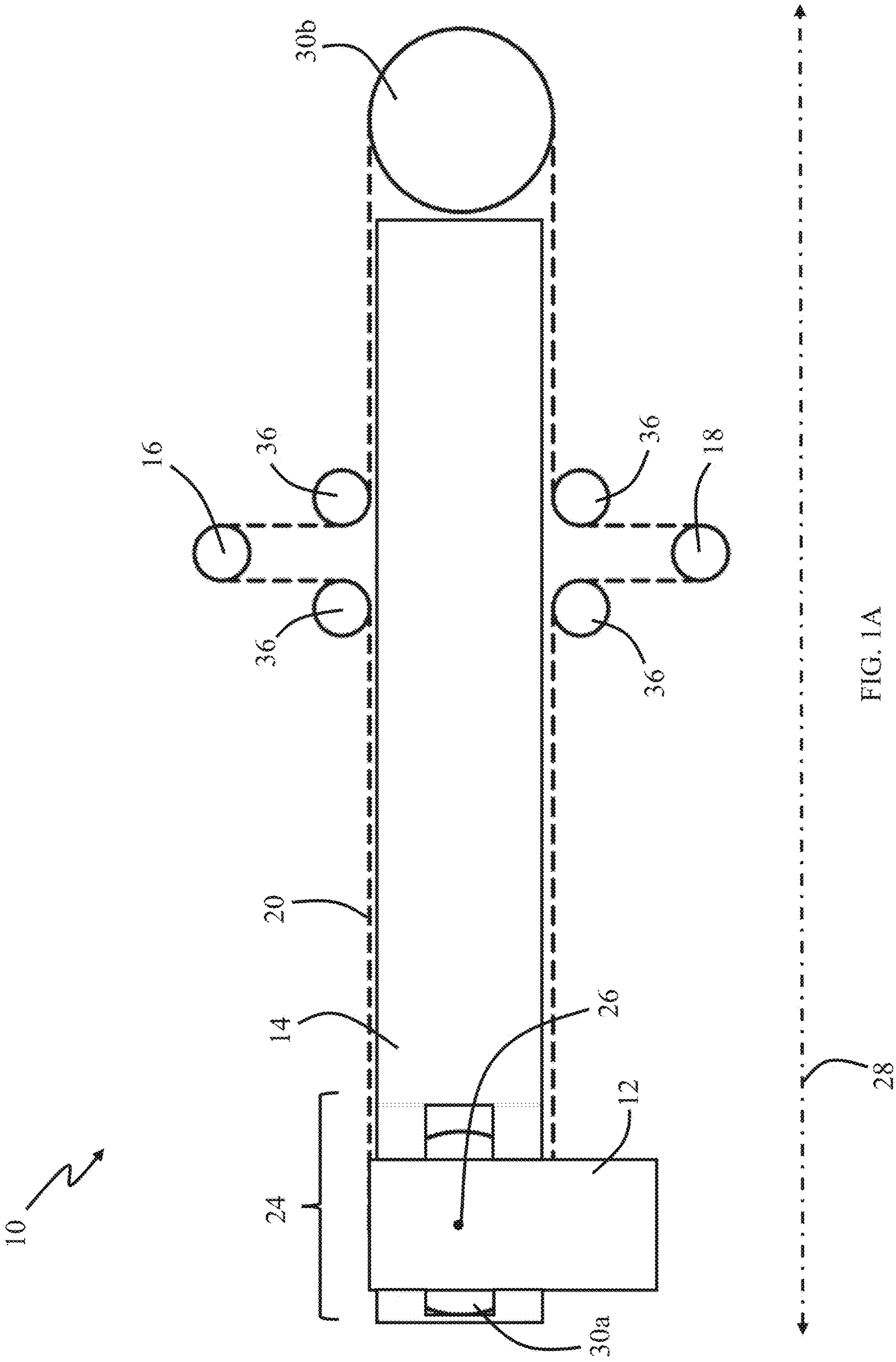
FIG. 1A is a side plan view of a multi-axis motion system for a toolhead, in accordance with the present disclosure.

FIG. 1A is a side plan view of a multi-axis motion system 10 (hereinafter "system 10") for a toolhead 12, in accordance with the present disclosure. The system 10 has a linear rail 14 positioned between a first drivable pulley 16 and a second drivable pulley 18. A flexible belt 20 may be positioned in contact with each of the first and second drivable pullies 16, 18 and positioned along a belt path of the linear rail 14. A toolhead 12, which may be any type of end effector, may attach to an end portion 24 of the linear rail 14. The toolhead 12 may be rotatable about a first axis 26, which is formed substantially perpendicular to an elongated axis 28 of the linear rail 14. Rotation of the toolhead 12 about the first axis 26 is controlled by activation of one of the at least two drivable pullies 16, 18.

The linear rail 14 may be a structural member having sufficient strength to support the toolhead 12 on an end portion thereof, and may be made of a metal, composite, plastic, resin material. The linear rail 14 may be positioned between a first drivable pulley 16 and a second drivable pulley 18, where the first and second drivable pullies 16, 18 are positioned substantially opposite to one another and on opposing elongated sides of the linear rail 14. The flexible belt 20 may be positioned to be in contact with, or to partially wrap around at least a portion of the first and second drivable pullies 16, 18 and the linear rail 14, The flexible belt 20 may be oriented along a belt path of the linear rail 14 by a plurality of idlers 36 or guide structures. The plurality of idlers 36 may be bearings, ball bearings, or other structures to orient the flexible belt 20 along the belt path of the linear rail 14. This configuration may drive or move the flexible belt 20 when the drivable pullies 16, 18 are driven or rotated. The belt path of the linear rail 14 may be defined by the portion of the linear rail 14 where the flexible belt 20 is located or oriented. The belt path of the linear rail 14 need not be a linear path. For example, if the starting point of the belt path is at the first drivable pulley 16, the belt extends towards each terminating end of the linear rail 14, and may extend beyond at least one terminating end of the linear rail 14 and over a first end pulley 30*a* and a second end pulley 30*b*. The flexible belt 20 and therefore the belt path may wrap around at least a portion of each end pulley 30*a*, 30*b* to change the flexible belt's 20 direction of travel. The belt path can also be described as a continuous loop. In another example, the linear rail 14 may extend beyond the belt path, such that the terminating end of the linear rail is positioned beyond each of end pullies 30*a*, 30*b*.

The toolhead 12 attaches to an end portion 24 of the linear rail 14, which is a portion of the linear rail 14 proximate to a terminating end thereof. The toolhead 12 may be one of an additive manufacturing extruder, CNC toolhead, and robotic arm. In the case of an additive manufacturing extruder, the toolhead may be a direct drive extruder, a Bowden extruder, a flexion extruder or a multi/dual head extruder. The toolhead 12 may attach to the first end pulley 30*a* of the linear rail 14, such that motion of the flexible belt 20 may cause the toolhead 12 to rotate about a first axis 26. The movement of the two drivable pullies 16, 18 may drive the flexible belt 20, which in turn may rotate the toolhead 12 about first axis 26 when the two drivable pullies 16, 18 are in a fixed lateral position relative to the flexible belt 20. The fixed lateral position may be when the drivable pullies 16, 18 are only able to move in a rotational direction and are fixed about a rotational axis. Toolhead 12 rotation about the first axis 26 may occur by driving the flexible belt 20 by either one of the first or second drivable pulley 16, 18 or by driving both of the first and second drivable pulley 16, 18 in the same rotational direction.

In one example, both of the first and second drivable pulley 16, 18 may be driven counterclockwise, which revolves the flexible belt 20 in a counterclockwise direction along the belt path of the linear rail 14. This counterclockwise rotation of the flexible belt 20 about the linear rail 14 rotates the toolhead 12 or the first end pulley 30*a* with the toolhead 12 mounted thereto in a counterclockwise direction. In another example, clockwise motion of the drivable pullies 16,18 rotates the flexible belt 20 in a clockwise direction, which in turn rotates the toolhead 12 or the first end pulley 30*a* with the toolhead 12 mounted thereto in a clockwise direction. Rotation of the drivable pullies 16, 18 in the same rotational direction primarily rotates the toolhead 12 about the first axis 26 without inducing translational or other movement of the linear rail 14.

While rotation of the drivable pullies 16, 18 in the same direction can be used to rotate the toolhead 12, rotation of the drivable pullies 16, 18 may also cause translational movement of the linear rail 14 along an elongated axis 28, e.g., lateral or side-to-side movement of the linear rail 14. For instance, translational movement of the linear rail 14 along the elongated axis 28 may also be controlled by the activation of at least one of the at least two drivable pullies 16, 18, or by both of the drivable pullies 16, 18 being moved in different directions. The linear rail 14 may attach to each of the end pullies 30*a*, 30*b* such that each end pulley 30*a*, 30*b* is rotatable about its respective rotation axes. Translational movement of the linear rail 14 of the elongated axis 28 of the linear rail 14 occurs as a result of the two drivable pullies 16, 18 being positioned in a fixed lateral position, where the drivable pullies 16, 18 are only able to move in a rotational direction about a rotational axis. Movement of at least one of the at least two drivable pullies 16, 18 may cause the linear rail 14 to move translationally along an elongated axis 28. Movement of both drivable pullies 16, 18 in opposite rotational directions may also cause translational movement of the linear rail 14 along an elongated axis 28.

In one example, the first drivable pulley 16 may move in a clockwise direction as the second drivable pulley 18 moves in a counterclockwise direction. These rotational directions of each of the first and second drivable pullies 16, 18 causes translational movement of the linear rail 14 in a first translational direction, namely, movement in a direction from left to right when viewing the system 10 in FIG. 1A.

In another example, rotational movement of the first drivable pulley 16 in a counterclockwise direction and the second drivable pulley 18 in a clockwise direction may cause translational movement of the linear rail 14 in a second translational direction, namely, in a direction from right to left per the system 10 depicted in FIG. 1A.

Rotational movement of the toolhead 12 and translational movement of the linear rail 14 along a first elongated axis 28 may also be achieved simultaneously when one of the first or second drivable pulley 16, 18 is activated. For example, counterclockwise motion of the second drivable pulley 18 while keeping the first drivable pully 16 in a static position, i.e., not rotating, causes the toolhead 12 to move in a counterclockwise direction while simultaneously moving the linear rail 14 along the elongated axis 28 in a direction from left to right per the system 10 depicted in FIG. 1A. Either one of the first or second drivable pulley 16, 18 may be moved in a clockwise or counterclockwise direction to achieve various combinations of toolhead 12 rotational motion and translational motion of the linear rail 14 along the elongated axis 28.

Figure 1B:
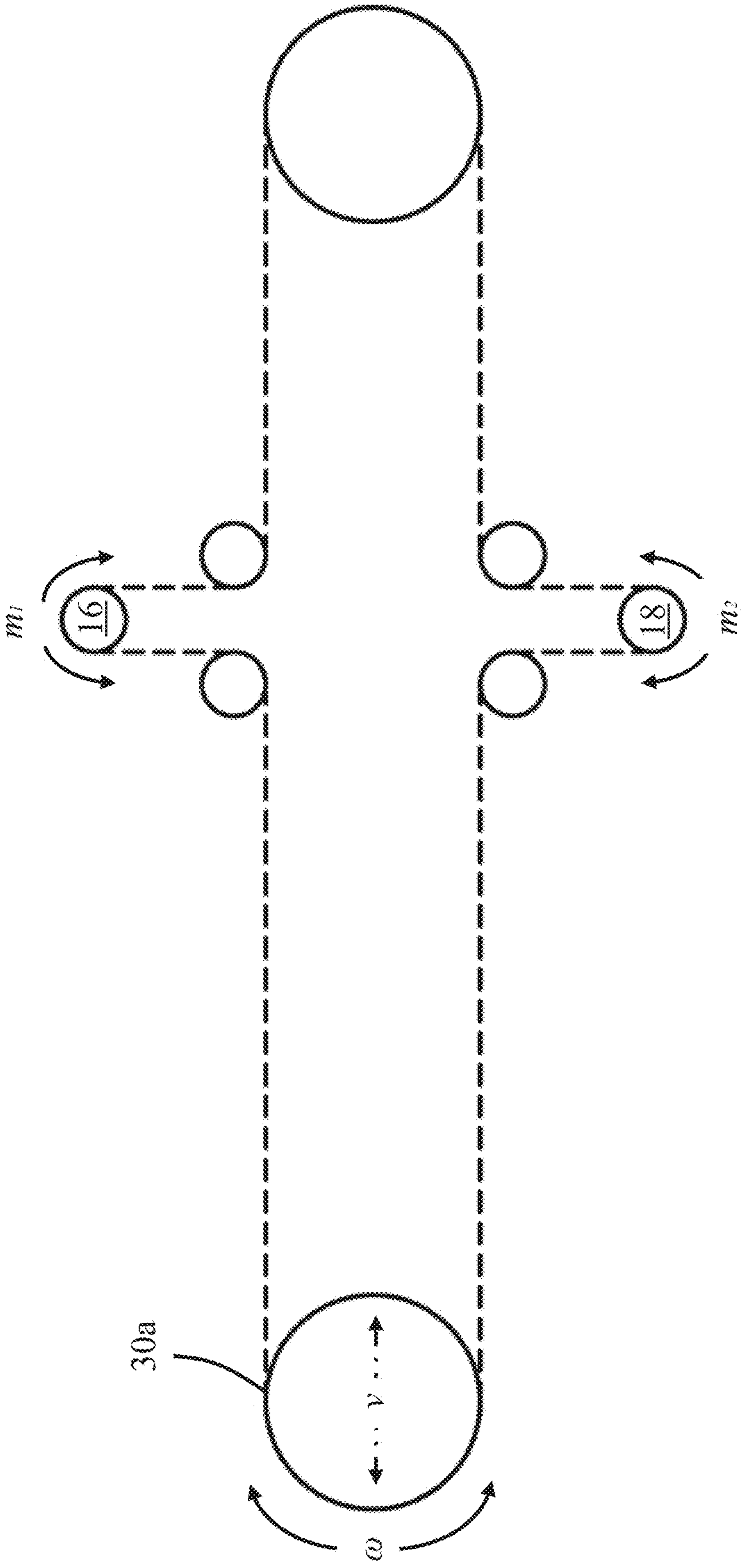
FIG. 1B is a schematic illustration of the multi-axis motion system of FIG. 1, in accordance with the present disclosure.

FIG. 1B is a schematic illustration of the system 10 of FIG. 1A, in accordance with the present disclosure, which depicts further details of the motion occurring in the system 10 described in FIG. 1A. The linear velocity, $v$ of a toolhead mounted to the first end pulley 30*a* and the rotational velocity, $\omega$ of the toolhead can also be expressed mathematically, where $v$ represents the linear velocity of the toolhead in m/s and $\omega$ represents the rotational velocity of the toolhead in rotations/s. Each respective velocity can be calculated by the following equation.

$$v = \frac{c_m}{2}(-m_1 + m_2)$$

$$\omega = \frac{c_m}{2c_d}(m_1 + m_2)$$

Where, $m_1$ is the rotational velocity of the first drivable pulley 16 in rotations/s; $m_2$ is the rotational velocity of the second drivable pulley 18 in rotations/s; $c_m$ is the circumference of the first and second drivable pullies 16, 18 in m/rotation; and $c_d$ is the circumference of the first end pulley 30*a* attached to the toolhead in m/rotation.

Accordingly, the ratio of linear to rotational torque is given by the following equation:

$$\text{linear:rotational torque} = \frac{c_m}{c_d}$$

As this ratio increases, the linear axis torque increases compared to the rotational axis torque.

Figure 2:
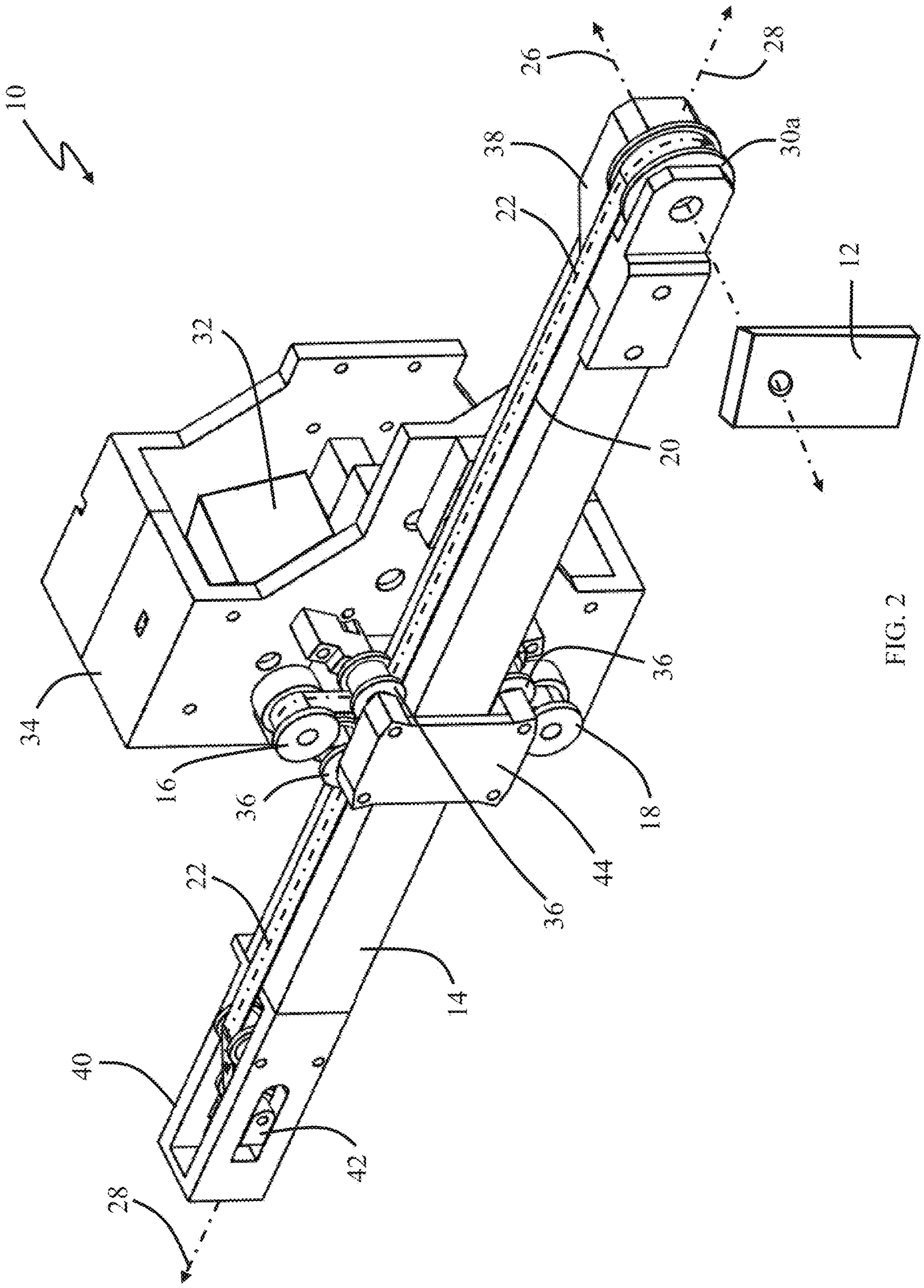
FIG. 2 is a perspective view of a multi-axis motion system for a toolhead, in accordance with the present disclosure.
Figure 3:
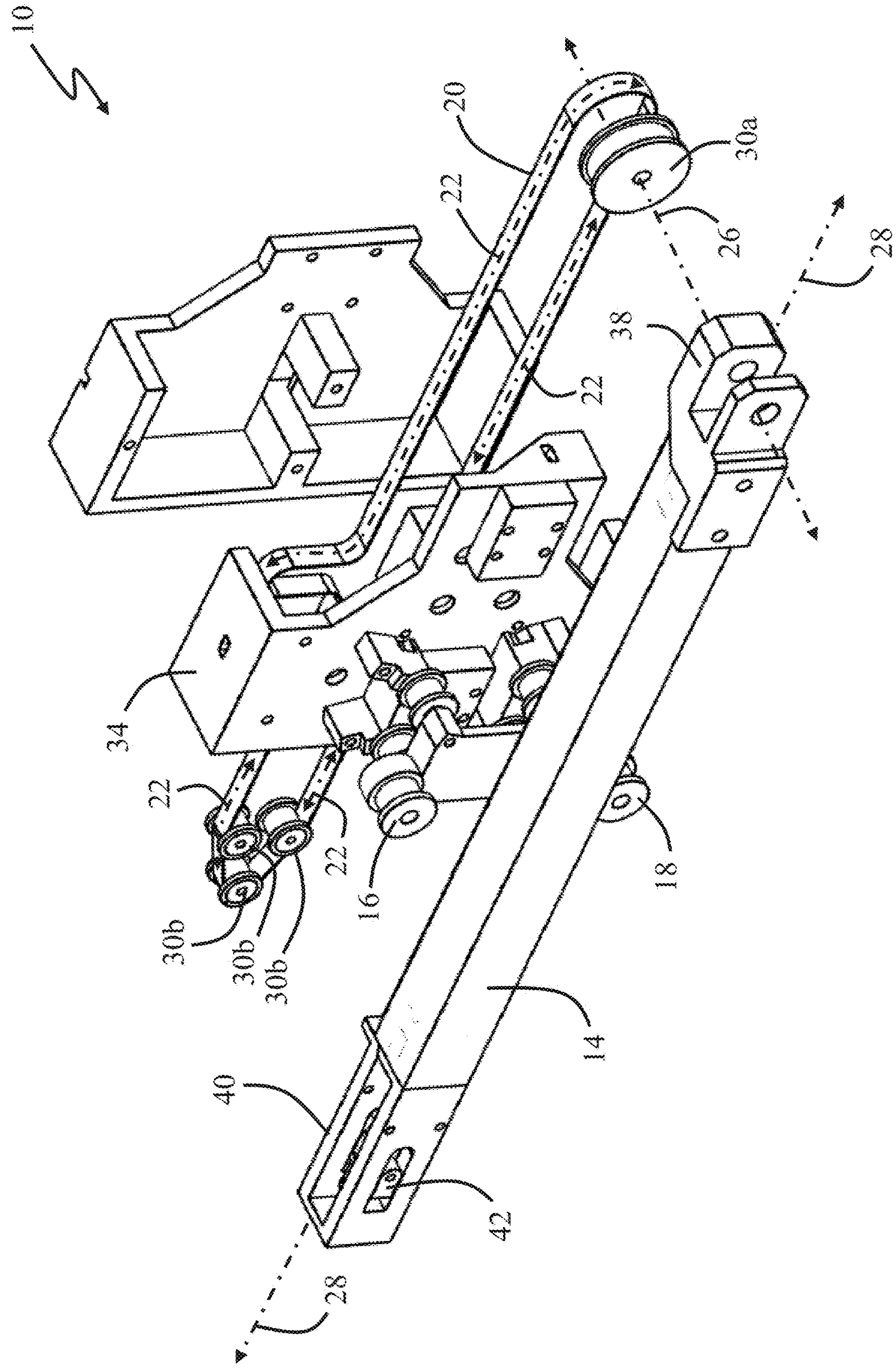
FIG. 3 is an exploded perspective view of the multi-axis motion system of FIG. 2, in accordance with the present disclosure.

FIG. 2 is a perspective view of a multi-axis motion system 10 for a toolhead 12, in accordance with the present disclosure. FIG. 3 is an exploded perspective view of the multi-axis motion system 10 of FIG. 2, in accordance with the present disclosure. With reference to FIGS. 2-3, illustrated is a linear rail 14 positioned between a first drivable pulley 16 and a second drivable pulley 18, where each of the first and second drivable pullies 16, 18 are each mounted to a motor 32. The motors are positioned within a housing 34 and remain stationary relative to movement of the linear rail 14 along the elongated axis 28 and rotational movement of the toolhead 12 about the first axis 26. Each first and second drivable pulley 16, 18 is mounted to a shaft of a first motor 32 and second motor (not illustrated), respectively. Each of the first and second drivable pullies 16, 18 is mounted to their respective motors, such that each of the first and second drivable pullies exhibits only rotational motion, relative to the linear rail 14 and the toolhead 12.

Positioned along each side of the linear rail 14 and between the first and second drivable pullies 16, 18 is a plurality of idlers 36. The plurality of idlers 36 may be bearings, ball bearings, or other guide structures used to orient the flexible belt 20 along each side of the linear rail 14. In one example, the first drivable pulley 16 is positioned above two of the plurality of idlers 36, where each idlers 36 is positioned offset from a vertical axis of the first drivable pulley 16, and each idlers 36 is positioned opposite to the other. In other words, the arrangement of the first drivable pulley, and two of the plurality of idlers 36 substantially forms a T-like shape or an upside down T-like shape.

The linear rail has a first end 38 and a second end 40. A first end pulley 30*a* is positioned on the first end 38 of the linear rail 14. A second end pulley 30*b* is positioned at the second end of the linear rail 40 and may include a single or a plurality of pullies. In one example at least one second end pulley 30*b* is positioned on a second end 40 of the linear rail 14 opposite to the position of the first end pulley 30*a*. In another example, a plurality of second end pullies 30*b* as shown in FIG. 3, is positioned on a second end 40 of the linear rail 14 opposite to the position of the first end pulley 30*a*. The toolhead 12 may connect to the first end pulley 30*a* by a bolt, fastener, screw, clip, or other feasible attachment method. The toolhead 12 may be secured to the first end pulley 30*a* such that it does not rotate relative to the first end pulley 30*a*. As a result, the first end pulley 30*a* and the toolhead 12 may rotate together as a single unit about the first axis 26.

The second end pulley 30*b* is positioned at the second end of the linear rail 40 and may include a single or a plurality of pullies. The second end pulley 30*b* may be configured as a belt tensioner 42, which is used to increase tension on or provide slack to the flexible belt 20. This may be particularly useful in servicing or repairing the system 10, where the flexible belt 20 can be slacked by the belt tensioner 42, and thus may be removable from each of the end pullies 30*a*, 30*b*, the plurality of idlers 36, and from each of the drivable pullies 16, 18. Alternatively, the flexible belt 20 may also be tightened by the belt tensioner 42 around each of these structures to ensure sufficient contact such that the drivable pullies 16, 18 are able to exert sufficient force on the flexible belt 20 and such that the flexible belt 20 is able to exert sufficient force on each of the end pullies 30*a*, 30*b* to move the linear rail 14 and the toolhead 12, as the case may be.

The linear rail 14 may be further secured to the housing by a linear rail bracket 44. The linear rail bracket 44 may removably connect to each of the idlers 36 of the plurality of idlers 36 and may prevent movement of the linear rail 14 in a direction perpendicular to the elongated axis 28. Each of the components of the system 10, such as the housing 34, and the linear rail bracket 44 may be made by additive manufacturing. The linear rail 14 may also be made by additive manufacturing, or may also be made through subtractive manufacturing such as milling, CNC, machining, and the like. The linear rail 14 may have an indent or channel to provide additional space for the flexible belt 20 as the flexible belt 20 moves along the belt path 22 of the linear rail.

The flexible belt 20 may be any device or component that can connect the drivable pullies 16, 18, the first end pulley 30*a*, second end pulley 30*b*, and each of the idlers 36 of the plurality of idlers 36 to one another and in any combination. The flexible belt 20 may be a cable, toothed timing belt, a V-belt, a chain, a smooth belt, and may be made from any flexible material, or non-flexible material arranged in a chain or chain-like manner. The drivable pullies, 16, 18, first and second end pulley 30*a*, 30*b*, and each of the idlers 36 of the plurality of idlers 36 may be designed to accommodate specific types of flexible belts 20. In one example, if the flexible belt 20 is a smooth flexible belt 20 made of a rubber, polyvinyl, or other flexible material, each of the drivable pullies, 16, 18, first and second end pulley 30*a*, 30*b*, and each of the idlers 36 may be u-pullies or u-bearings, where each pulley 16, 18, 30*a*, 30*b*, or guide structure 36 has a channel or circumferential slot positioned around the entirety of the circumference of the sidewall. In another example, if the flexible belt 20 is a toothed timing belt, then each pulley 16, 18, 30*a*, 30*b*, or guide structure 36 may have corresponding teeth and grooves to mate with the flexible belt 20, and may also have a channel or circumferential slot to further secure the flexible belt 20.

With reference to FIGS. 1A-3, different types and sizes of drivable pullies 16, 18, motors, flexible belts 20, and linear rails 14 may be used to achieve a specific output in terms of rotation of the toolhead 12 and translational movement of the linear rail 14. In one such example, a toothed timing belt may be used to mechanically connect each of the drivable pullies 16, 18, and may be positioned along the belt path 22. The idlers 36 may also be pullies that have a smaller size than each of the drivable pullies 16, 18. The idlers 36 in this example may be 16 tooth pullies with a circumference of approximately 30 mm and the drivable pullies 16, 18 may be 40 teeth pullies that have a circumference of approximately 78 mm. Two stepper motors 32 may each be connected to the first drivable pulley 16 and the second drivable pulley 18, respectively, and may be used to drive each of the drivable pullies 16, 18.

Figure 4A:
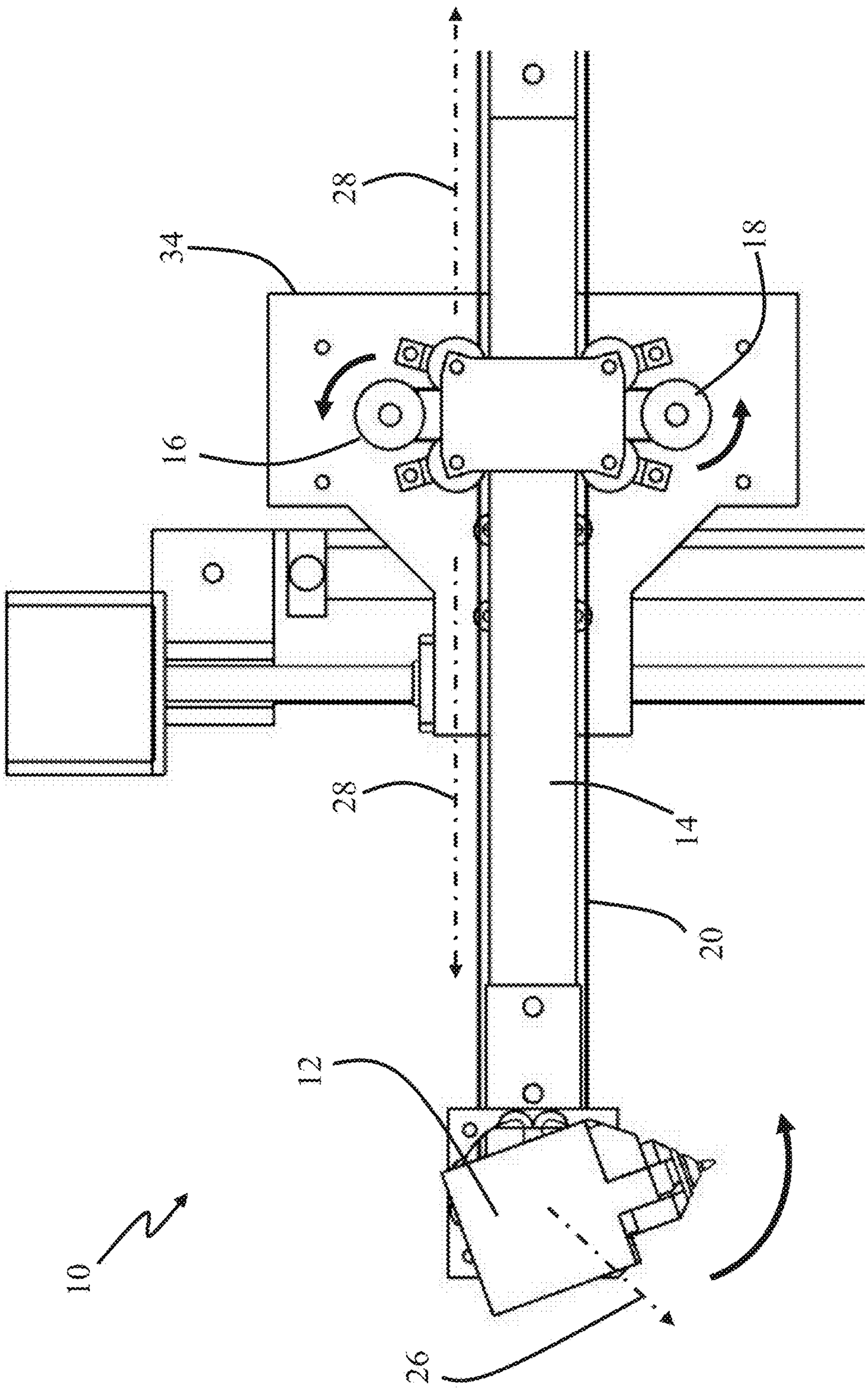
FIG. 4A is a side plan view of a multi-axis motion system for a toolhead in a first position, in accordance with the present disclosure.

FIG. 4A is a side plan view of a multi-axis motion system 10 for a toolhead 12 in a first position, in accordance with the present disclosure. FIG. 4A shows the rotation of the second drivable pulley 18 in a counterclockwise rotational direction as the first drivable pulley 16 remains stationary or stagnant. With reference to FIG. 4A, the movement of the second drivable pulley 18 in a counterclockwise rotational direction causes the toolhead 12 to move in a counterclockwise rotational direction about the first axis 26. Simultaneously, the linear rail 14 translationally moves along the elongated axis 28 in a rightward direction relative to the housing 34, as illustrated. Of particular note, the linear rail 14 translationally moves along the elongated axis 28 relative to the housing 34, which does not exhibit any substantial or material movement along the elongated axis 28 of the linear rail 14. In other words, neither of the drivable pullies 16, 18, nor the housing 34 and internal components thereof move translationally along the elongated axis 28 of the linear rail 14. The linear rail 14 and immediate components attached thereto, such as the toolhead 12, move translationally along the elongated axis 28. A steel rail having a length of 300-1000 mm may be used as the linear rail 14. In such an example, the linear rail 14 may be configured to travel a predetermined maximum translational distance along the elongated axis 28, and the toolhead 12 may be configured to rotate 225 degrees about the first axis 26. In other examples, the system 10 may be capable of rotating the toolhead 12 360 deg/s with an acceleration of 200 deg/$s^2$ and may be configured to move the toolhead 12 mounted to an end of the linear rail 14 translationally along the elongated axis 28 at 330 mm/s with an acceleration of 5000 mm/$s^2$.

Figure 4B:
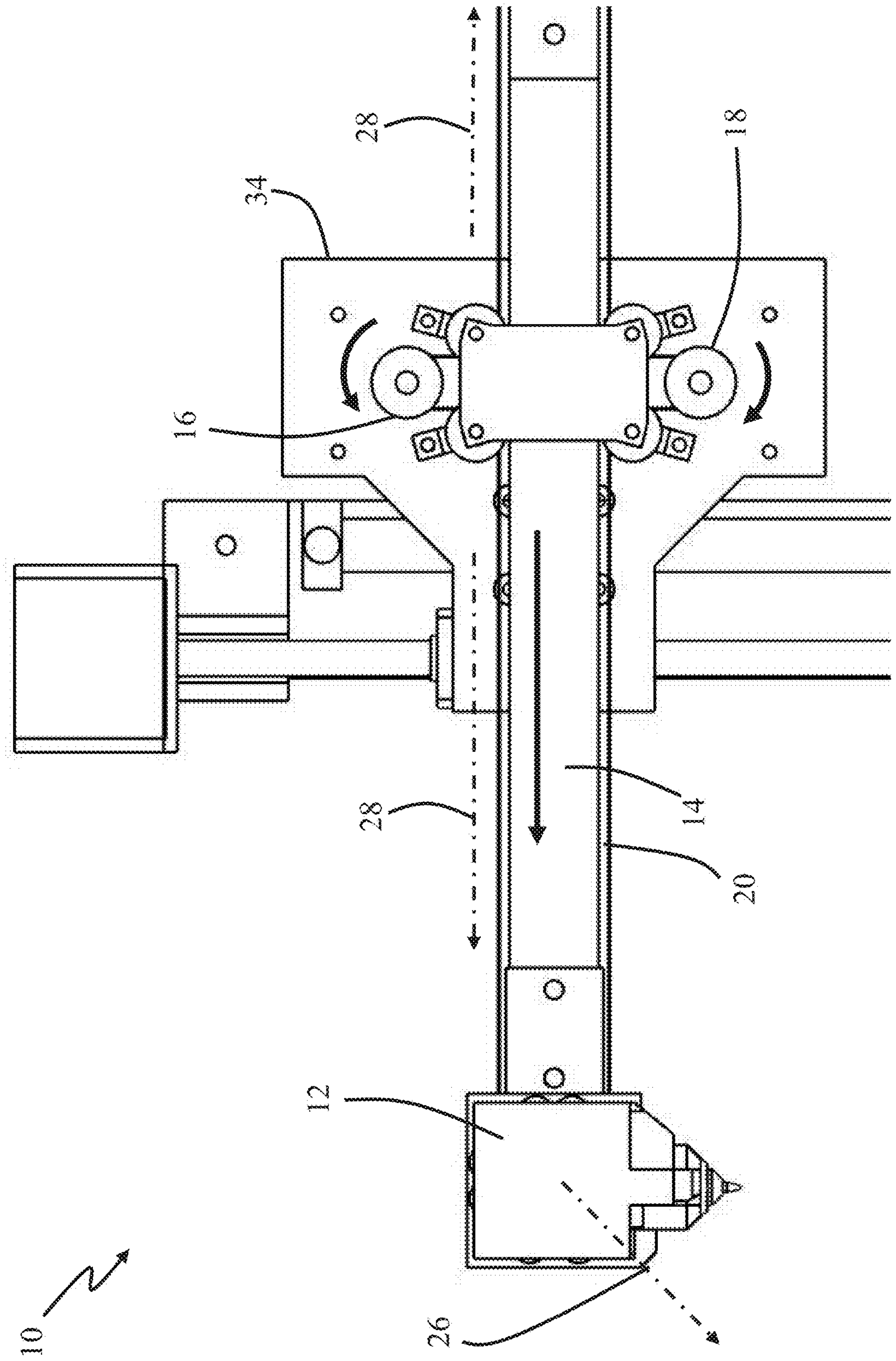
FIG. 4B is a side plan view of a multi-axis motion system for a toolhead in a second position, in accordance with the present disclosure.

FIG. 4B is a side plan view of a multi-axis motion system 10 for a toolhead 12 in a second position, in accordance with the present disclosure. Illustrated is the rotation of each of the drivable pullies 16, 18 in opposite rotational directions. The first drivable pulley 16 is rotated in a counterclockwise rotational direction as the second drivable pulley 18 is rotated in a clockwise rotational direction. As a result, the linear rail 14 moves translationally along the elongated axis 28 as the toolhead 12 remains rotationally stationary about the first axis 26. FIG. 4B contains several of the same or similar features and elements as described in FIG. 4A and are thus not restated herein for brevity in disclosure.

Figure 4C:
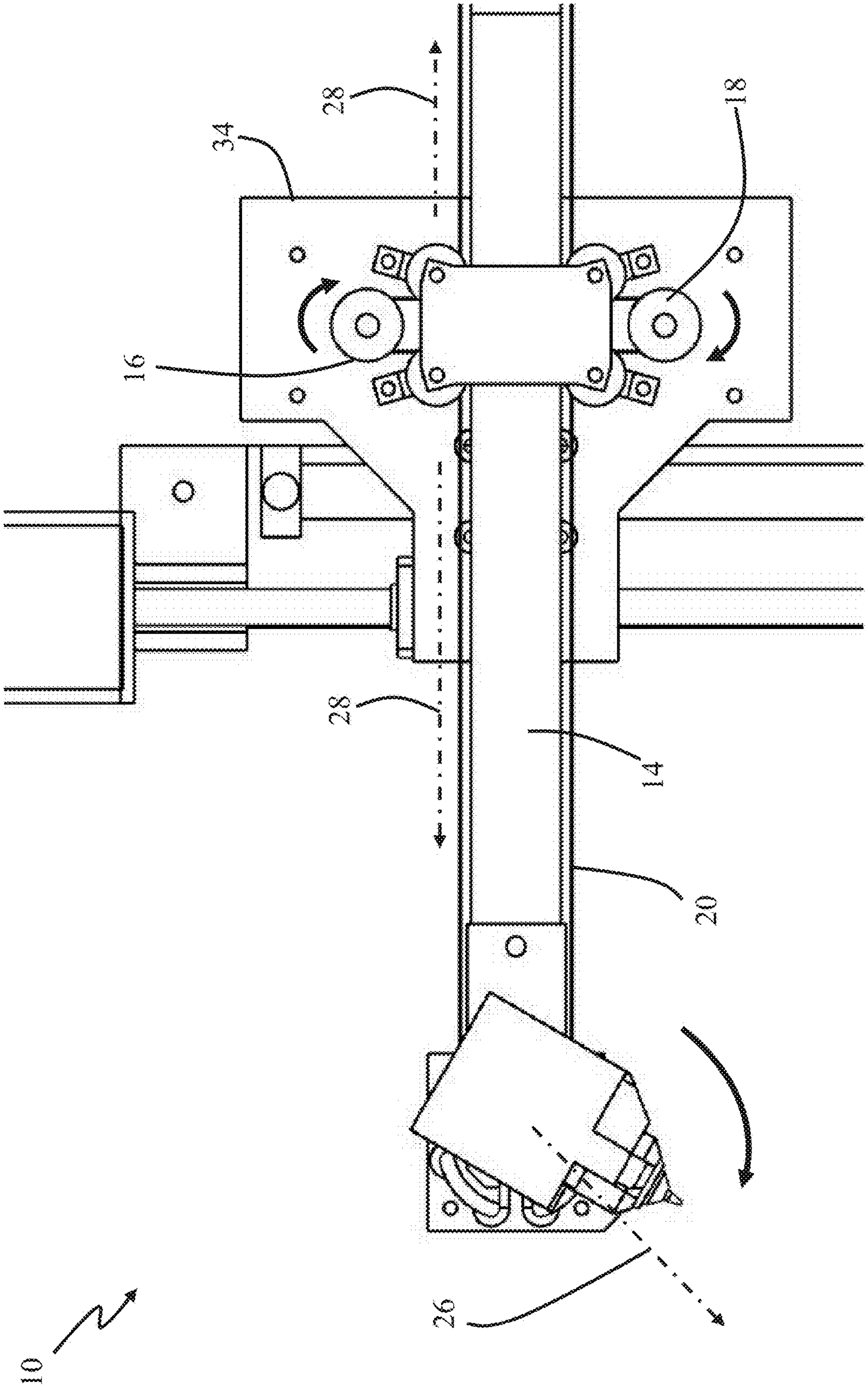
FIG. 4C is a side plan view of a multi-axis motion system for a toolhead in a third position, in accordance with the present disclosure.

FIG. 4C is a side plan view of a multi-axis motion system 10 for a toolhead 12 in a third position, in accordance with the present disclosure. Illustrated is the rotation of each of the drivable pullies 16, 18 in the same rotational direction. The first drivable pulley 16 is rotated in a clockwise rotational direction as the second drivable pulley 18 is also rotated in a clockwise rotational direction. As a result, the linear rail 14 remains translationally stationary along the elongated axis 28 as the toolhead 12 rotates about the first axis 26. FIG. 4C contains several of the same or similar features and elements as described in FIG. 4A and are thus not restated herein for brevity in disclosure.

With reference to FIGS. 4A-4C, translational movement of the linear rail 14 along the elongated axis 28 and rotational movement of the toolhead 12 about the first axis 26 may be combined or segmented into time portions. In operation, it may be beneficial to allow for both rotation of the toolhead 12 about the first axis 26 and translational movement of the linear rail 14 along the elongated axis 28. This may be achieved by moving each of the toolhead 12 about the first axis 26 and the linear rail 14 along the elongated axis 28 in time segments or in alternating patterns. The toolhead 12 may be rotatable about the first axis 26 while translationally moving the linear rail 14 along the elongated axis 28 by driving either one of, or both of the first and second drivable pullies 16, 18. In the example of FIG. 4A, only one of the drivable pullies 16, 18 is activated, which causes movement of both the toolhead 12 about the first axis 26 and translational movement of the linear rail 14 along the elongated axis 28. FIGS. 4B-4C illustrates discrete movement of the linear rail 14 along the elongated axis 28 and the toolhead 12 about the first axis 26, respectively. However, these discrete movements can be combined to create what may be perceived by a user to be continuous simultaneous movement of both the toolhead 12 about the first axis 26 and the linear rail 14 along the elongated axis 28. This may be achieved by timing the motion and rotation of each of the drivable pullies 16, 18 such that discrete movement of each of the toolhead 12 rotation and linear rail 14 translational movement is done in time segments of greater than zero seconds, but less than 1 second, during a mixed movement operation (i.e., in an operation that requires simultaneous or near motion of both the toolhead 12 and linear rail 14).

The generation of such movement paths of the toolhead 12 can be further explained with the following example. A point is defined (x, r), where x is the toolhead 12 linear position along the elongated axis 28, where such linear positioning is a result of the movement of the linear rail 14; and r is the rotational position of the toolhead 12. Since the toolhead 12 can move at or in any arbitrary mix of rotational and linear velocities, it follows that the toolhead 12 can move from any given initial point ($x_1$, $r_1$) to any other subsequent point ($x_f$, $r_f$) in one continuous motion. Therefore, the toolhead 12 can follow any arbitrary continuous path by spitting it into segments $(x_0, r_0)$, $(x_1, r_1)$, . . . , $(x_n, r_n)$. Segments can be made increasingly smaller, where a smaller segment correlates to a smaller movement of either one of or both of the toolhead 12 and the linear rail 14 and a lesser time spent in rotational motion and translational motion. Smaller segments may increase the accuracy of the toolhead 12 in reaching its subsequent point or final path from the initial point, however, this may require a greater digital file size and may require more robust and greater computing power to map out the toolhead 12 path. In some examples, segments may be 0.5 mm long, which provides reasonable accuracy of the toolhead 12, while maintaining a reasonable file size to map the toolhead 12 path. In other examples, the segments may be 0.1 mm long, which provides greater accuracy of the toolhead 12, but increases the file size. In yet another example, the segments may be 1 mm long, which decreases accuracy of the toolhead, but decreases the file size.

Figure 5A:
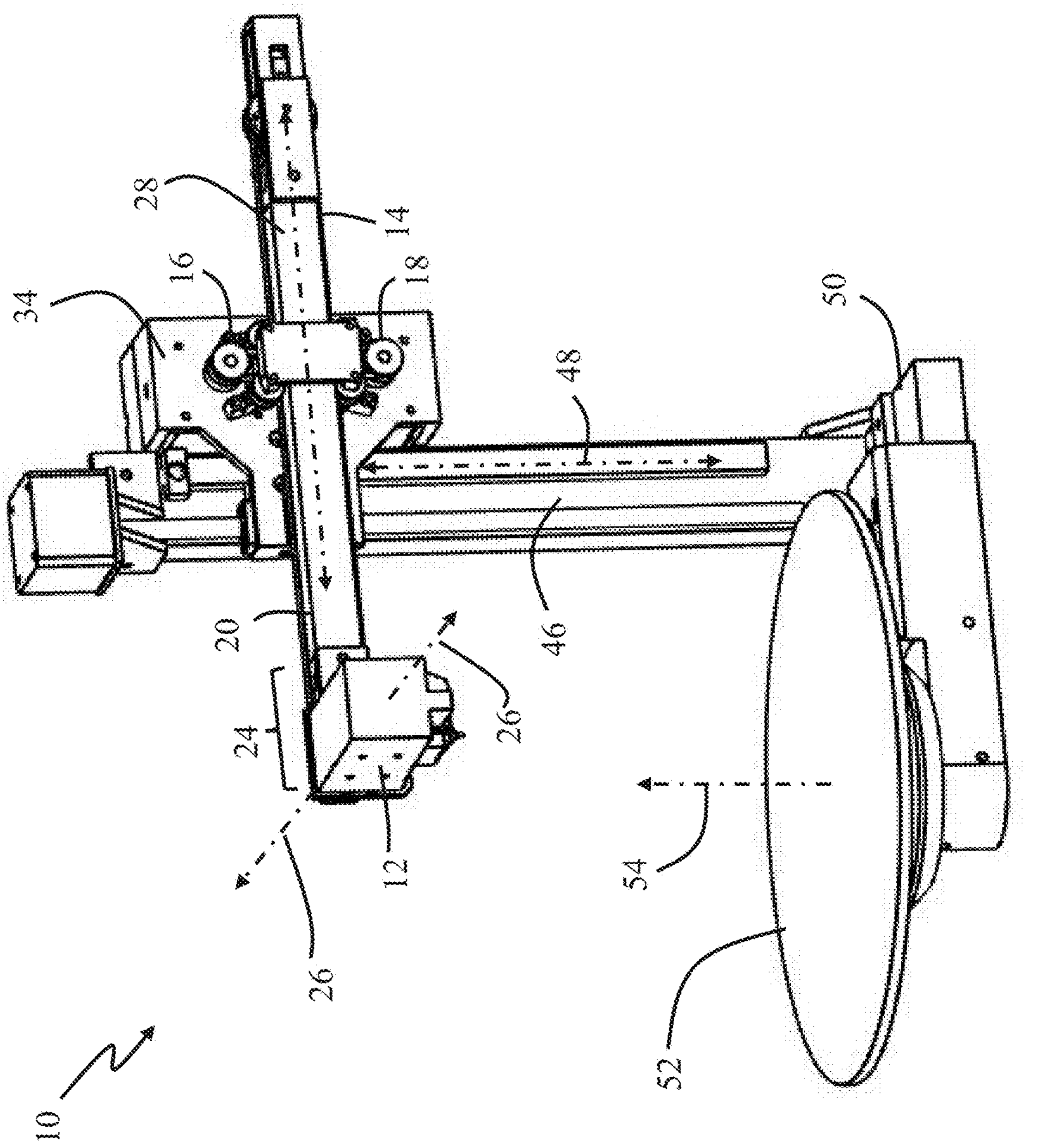
FIG. 5A is a side perspective view of a multi-axis motion system for a toolhead in a raised position, in accordance with the present disclosure.
Figure 5B:
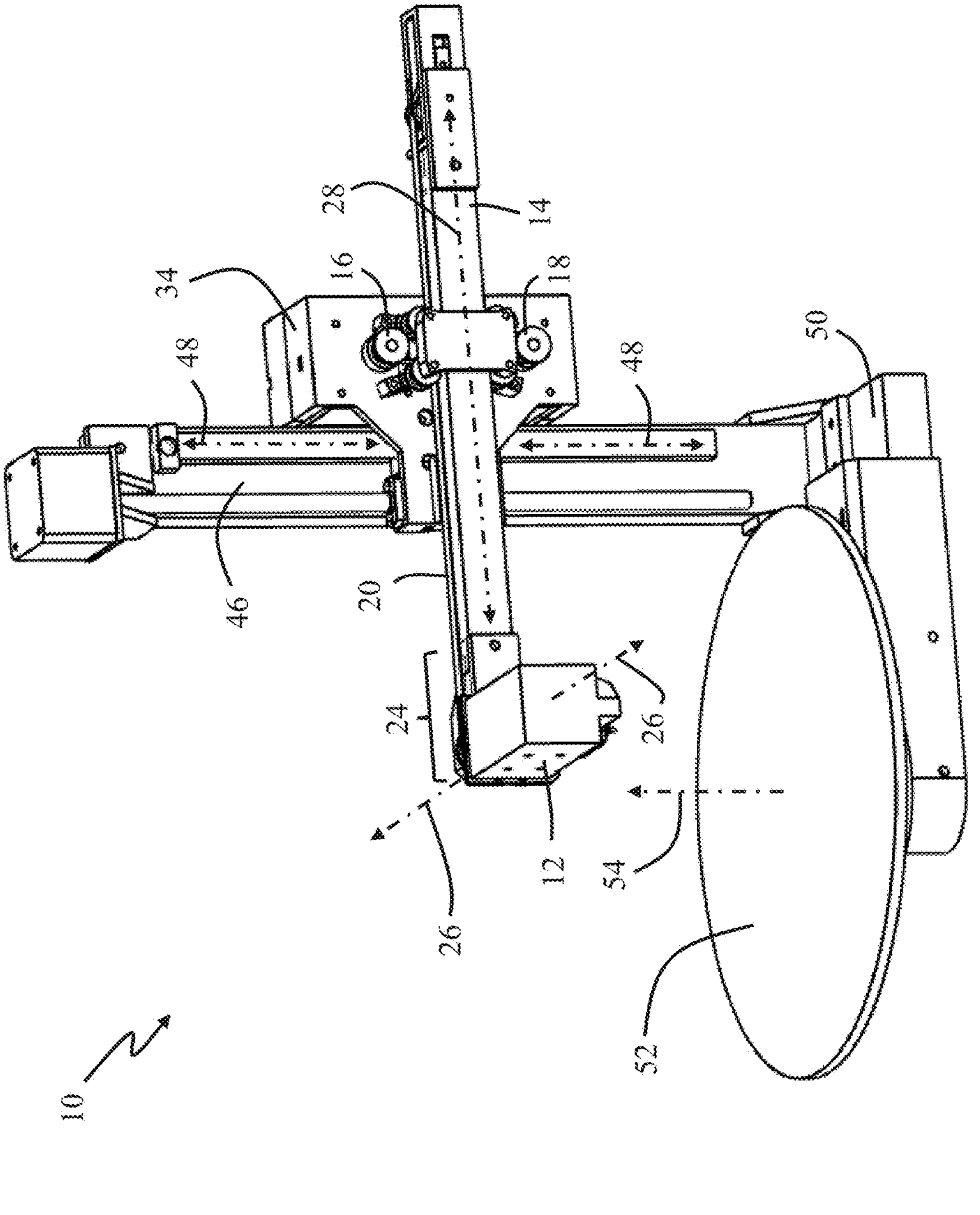
FIG. 5B is a side perspective view of a multi-axis motion system for a toolhead in a partially lowered position, in accordance with the present disclosure.

FIG. 5A is a side perspective view of a multi-axis motion system 10 for a toolhead 12 in a raised position, in accordance with the present disclosure. FIG. 5B is a side perspective view of a multi-axis motion system 10 for a toolhead 12 in a partially lowered position, in accordance with the present disclosure. With reference to FIGS. 5A-5B, the system 10 may also be arranged to have a first linear rail 14 positioned between a first drivable pulley 16 and a second drivable pulley 18 with a flexible belt 20 positioned in contact with each of the first and second drivable pullies 16, 18, as described previously. A second linear rail 46 may be positioned perpendicular to the first linear rail 14. The first linear rail 14 may be positioned and configured to be moveable along at least a portion of a length of the second linear rail 46. The toolhead 12 may attach to an end portion 24 of the first linear rail 14. The toolhead 12 is rotatable about the first axis 26 which is formed substantially perpendicular to the elongated axis 28 of the first linear rail 14 and formed substantially perpendicular to the second linear rail 46. The rotation of the toolhead 12 about the first axis 26 and translational movement of the first linear rail 14 along the elongated axis 28 is controlled by activation of at least one of the two drivable pullies 16, 18.

The second linear rail 46 enables the first linear rail 14 to move vertically or perpendicular to the elongated axis 28 of the first linear rail 14. It should be noted that the entirety of the housing 34, and all associated components move along the elongated path 48 of the second linear rail 46. This configuration of each of the first and second linear rail 14, 46, and of the rotatable toolhead 12 enables movement on three axes, where the entirety of the first linear rail 14 and toolhead 12 are able to move along the length of the second linear rail 46, the first linear rail 14 is able to move translationally along an elongated axis 28, and the toolhead 12 is able to rotate about a first axis 26. The first linear rail 14 may be movable along the second linear rail 46 by a belt system, threaded rod, and the like, and may be driven by a motor mounted to an end of the second linear rail 46 or mounted to a base structure 50 of the system 10.

The system 10 may also include a base plate 52 that is rotatable about a base plate center axis 54. The base plate 52 may be any metallic, ceramic, concrete, glass, high-strength plastic, or the like base plate 52, and may be configured to be heated to a predetermined temperature based on the desired operation of the system 10. For example, if the toolhead 12 is an additive manufacturing toolhead 12 that extrudes polylactic acid, the base plate 52 may be heated to a temperature in the range of 50-70 °C. In some examples, a cold temperature for the base plate 52 may be used. In this example, an adhesive or other sticker is applied to the base plate 52 to provide adhesion for material extruded out of the toolhead 12. In another example, certain materials may require higher base plate 52 temperatures exceeding 70 °C. In yet another example, additive manufacturing of metals and ceramics may require base plate 52 temperatures between 900 °C and 1400 °C. The toolhead 12, as an additive manufacturing toolhead 12, may also be configured to achieve temperatures up to and beyond 1400 °C. In the case of an additive manufacturing toolhead 12 used for plastic construction, a toolhead 12 hot end temperature of 300 °C may be sufficient.

The base plate 52 may be rotatable about the base plate center axis 54, and may rotate either by a base plate motor positioned directly under the base plate 52 and a shaft of the base plate motor connected substantially directly under the center axis 54 of the base plate 52. In another example, the motor may be offset from the base plate 52 and positioned elsewhere on the base structure 50 and subsequently connected to rotatably drive the base plate 52 with a pulley system, using either a belt, timing belt, chain, timing chain, or the like.

With the base plate, the entirety of the system 10 has 4 axes of movement. One axis of movement is along the linear rail 14, where the linear rail 14 and toolhead 12 connected to the linear rail 14 are able to move along the length of the second linear rail 46. Another axis of movement is the translational movement of the first linear rail 14 along an elongated axis 28. Another axis of movement is the rotational movement of the toolhead 12 about the first axis 26. Yet another axis of movement is the rotation of the base plate 52 about the center axis 54.

In an example where the system 10 is used for subtractive manufacturing, such as CNC or milling, an object may be placed and secured to the base plate 52, and the toolhead may be a router, drill press, grinding wheel, or other rotation based milling and shaping tool. In another example, the toolhead 12 may be a robotic arm, such as a claw, welder, soldering iron or soldiering tip, or the like. Similarly, the object to be acted on by the robotic arm toolhead 12 may be secured to the base plate 52, and then acted on by the robotic arm toolhead 12.

Figure 6:
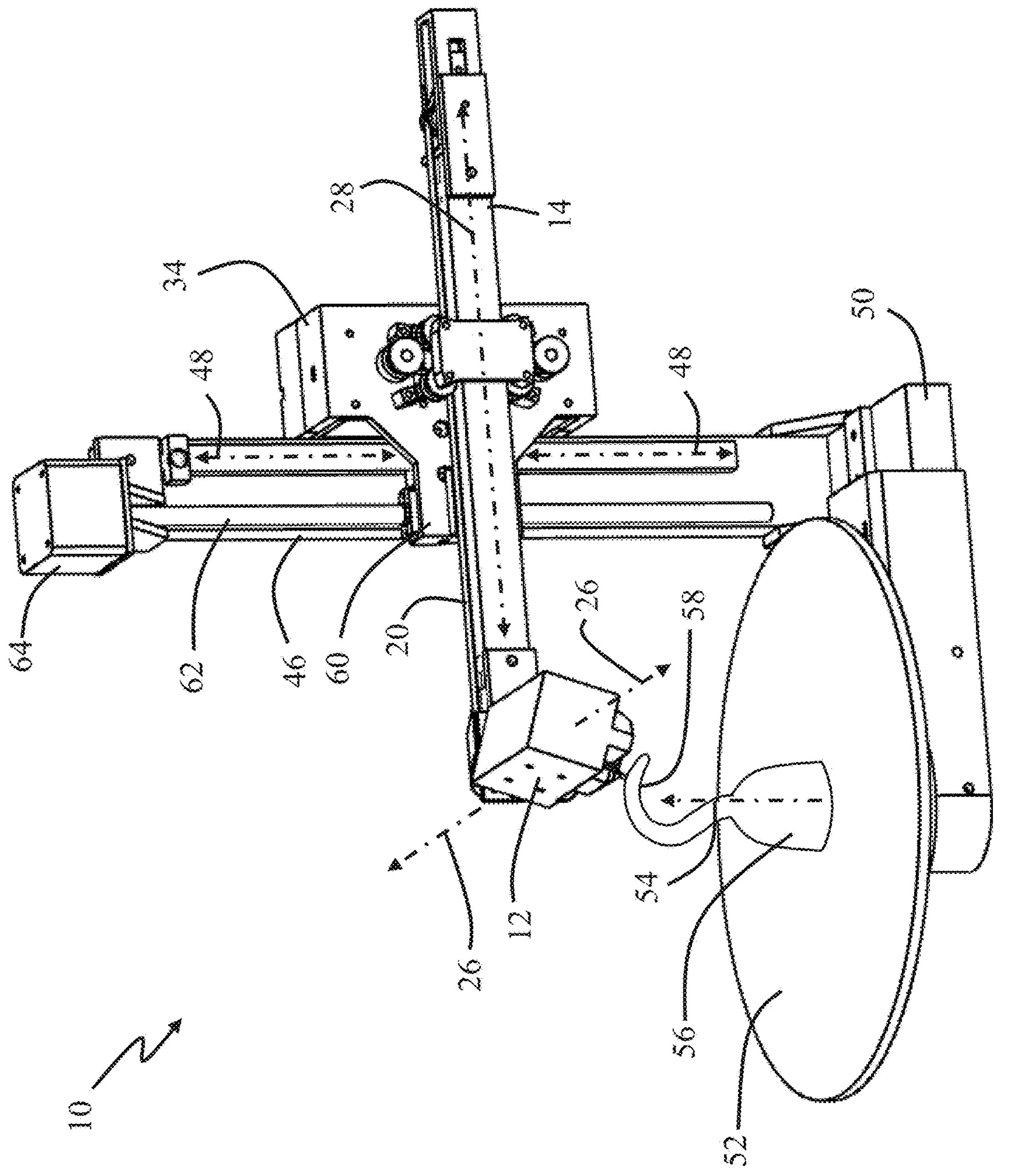
FIG. 6 is a side perspective view of a multi-axis motion system for a toolhead in use, in accordance with the present disclosure.

FIG. 6 is a side perspective view of a multi-axis motion system 10 for a toolhead 12 in use, in accordance with the present disclosure. In this example, the toolhead 12 is an additive manufacturing extruder used for additively manufacturing an object 56. In particular, overhangs 58 of the object 56 are able to be additively manufactured using the rotational movement of the toolhead 12 about the first axis 26. These overhangs 58 or floating cantilevers are able to be additively manufactured without the use of supports or rafts, thus potentially decreasing manufacturing time, and decreases material wase. In another example, the rotation of the toolhead 12 about the first axis 26 further creates a stronger object 56 and overhang 58 with a more uniform and smooth overhang 58 undersurface as compared to overhangs 58 created by using supports and rafts.

As the height of the object on the base plate 52 increases with continued deposition of material, the entirety of the toolhead 12, first linear rail 14, and housing 34 and components thereof move along the elongated path 48 of the second linear rail 46. The first linear rail 14 remains in a substantially perpendicular orientation relative to the second linear rail 46 for the entirety of the movement along the elongated path 48 of the second linear rail 46. The housing 34 may have an interfacing portion 60 that is configured to interface with a threaded rod 62, belt, toothed timing belt, or chain positioned along the elongated path 48 of the second linear rail 46, that enables movement of the first linear rail 14 perpendicular to the second linear rail 46. In one example, a threaded rod 62 interfaces with the interfacing portion 60, where the threaded rod 62 passes through the interfacing portion 60 and the interfacing portion 60 has corresponding threads, such that rotational movement of the threaded rod 62 in either the clockwise or counterclockwise direction causes the interfacing portion 60 to move in a translational direction along the threaded rod 62 and elongated path 48 of the second linear rail 46. The threaded rod 62, belt, toothed timing belt, or chain of the second linear rail 46 may be driven by a second linear rail motor 64. The second linear rail motor 64 may be mounted to the top of the second linear rail 46, the base structure 50, or may be mounted within the base structure 50 and connected to the threaded rod 62, belt, toothed timing belt, or chain by a pulley system.

The toolhead 12, prior to additive manufacturing operations, may need to be calibrated, along with each other axis. The toolhead 12 may be calibrated by using a momentary switch or sensor mounted to a side of the toolhead 12, such that when the toolhead 12 is rotated, the momentary switch or sensor is positioned to face the base plate 52. Once the toolhead 12 is rotated, the threaded rod 62 of the second linear rail 46 may rotate to lower the toolhead 12 and first linear rail 14 until the momentary switch or sensor mounted to the toolhead 12 contacts the base plate 52. On contact, the system 10 notes the coordinates to determine the bed level of the base plate 52, thus setting a maximum lower limit that the toolhead 12 can travel before contacting the base plate 52 or damaging the base plate 52. Similar mechanisms may be used to determine the maximum travel distance of each of the base plate 52 about the center axis 54, the first linear rail 14 along the elongated axis 28 and the second linear rail 46 along the elongated axis 48 of the second linear rail. Travel distances of each of these other structures may also be determined by driving their respective pullies and motors until the motors stall in each travel direction.

The toolhead 12 may also establish an exclusion zone relative to the base plate 52, such that rotation of the toolhead 12 about the first axis 26, when used in an additive manufacturing operation, does not collide with the base plate 52. In other words, the toolhead 12 may establish a maximum angle of rotation in each rotational direction when the tip of the toolhead 12 is in contact with the base plate 52. In one example, this may be 135° in each clockwise and counterclockwise direction when the tip of the toolhead 12 is aligned with the center axis 54. The size of the exclusion zone may gradually increase as the toolhead 12 moves away from the base plate 52 and may vary based on the object 56 being created and the coordinates thereof. The exclusion zone may also vary based on the type of toolhead 12 used and the size of the toolhead 12.

The toolhead 12 may require a cooling mechanism, which serves to prevent the toolhead 12 from overheating and may also allow material deposited to also cool more quickly. The toolhead 12 may have a small fan mounted to a side and have airflow directed substantially towards the tip or nozzle of the toolhead 12. In another example, the cooling fan, pump, or other apparatus may be external to the system 10 and connected to the toolhead 12 by a tubing that is configured to directly or indirectly direct airflow substantially towards the tip or nozzle of the toolhead 12. In an example where the toolhead 12 is a CNC router, where greater cooling methods may be desired, the tubing may be configured to carry a liquid or water at a given pressure to ensure proper cooling of the toolhead 12 and of the material worked on or deposited.

Figure 7:
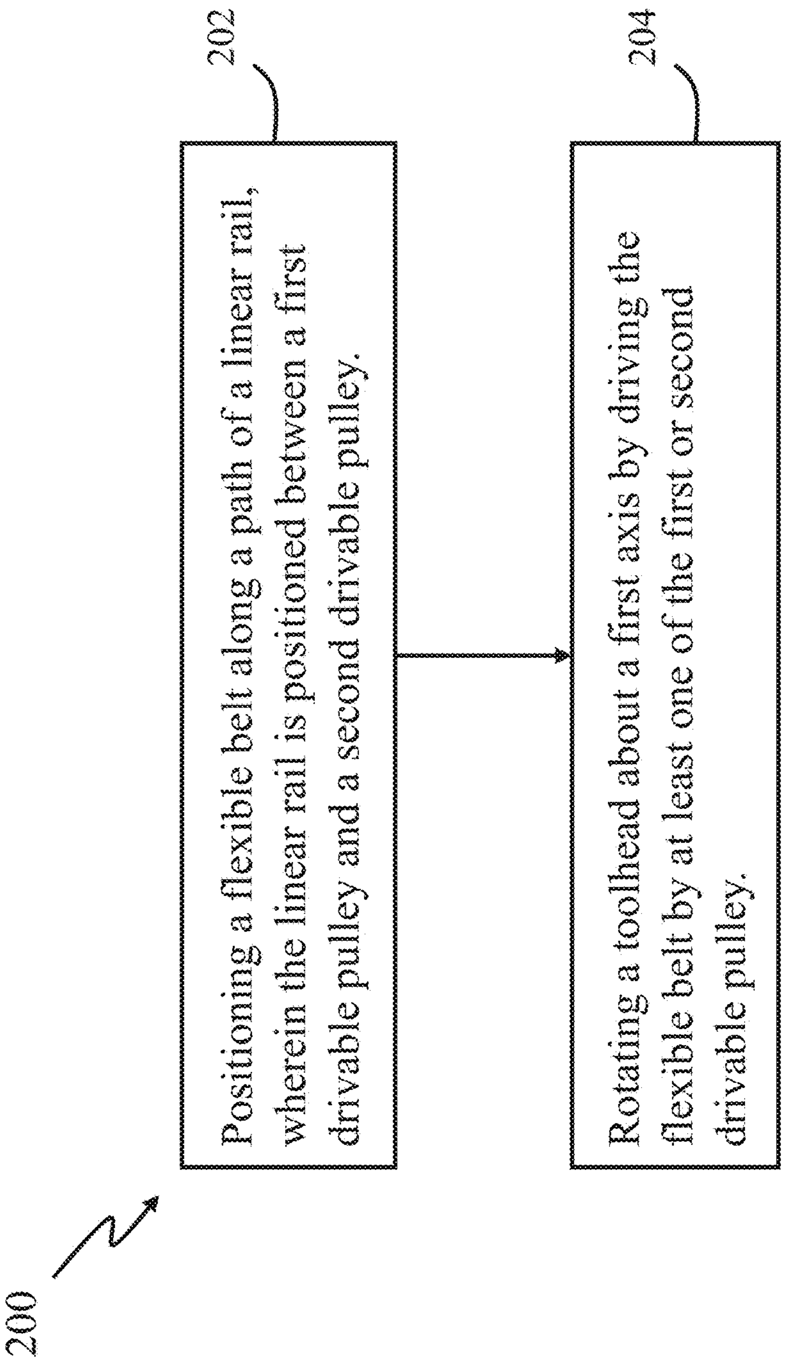
FIG. 7 is a method for multi-axis motion of a toolhead, in accordance with the present disclosure.

FIG. 7 is a flowchart 200 illustrating a method for multi-axis motion system for a toolhead, in accordance with the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a flexible belt is positioned along a path of a linear rail, wherein the linear rail is positioned between a first drivable pulley and a second drivable pulley. In block 204, a toolhead is rotated about a first axis by driving the flexible belt by at least one of the first or second drivable pulley, wherein the first axis is formed substantially perpendicular to an elongated axis of the linear rail. Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A multi-axis motion system for a toolhead, comprising:

a linear rail positioned between at least two drivable pullies;

a flexible belt positioned in contact with each of the at least two drivable pullies and positioned along a belt path of the linear rail; and a toolhead attached to an end portion of the linear rail and positioned coaxial with an end pulley of the linear rail, wherein the toolhead is rotatable about a first axis, wherein the first axis is formed substantially perpendicular to an elongated axis of the linear rail, wherein the first axis and the elongated axis of the linear rail are substantially horizontal, and wherein a rotation of the toolhead about the first axis is controlled by activation of one drivable pulley of the at least two drivable pullies.

2. A multi-axis motion system for a toolhead, comprising:

a linear rail positioned between at least two drivable pullies;

a flexible belt positioned in contact with each of the at least two drivable pullies and positioned along a belt path of the linear rail; and a toolhead attached to an end portion of the linear rail, wherein the toolhead is rotatable about a first axis, wherein the first axis is formed substantially perpendicular to an elongated axis of the linear rail, and wherein a rotation of the toolhead about the first axis is controlled by activation of one drivable pulley of the at least two drivable pullies wherein translational movement of the linear rail along the elongated axis is controlled by activation of the one drivable pulley of the at least two drivable pullies.

3. The system of claim 2, wherein translational movement of the linear rail along the elongated axis is controlled by activation of two of the at least two drivable pullies, wherein both of the at least two drivable pullies rotate in opposite rotational directions.

4. The system of claim 1, further comprising a second linear rail positioned perpendicular to the linear rail, wherein the linear rail is movable along at least a portion of a length of the second linear rail.

5. The system of claim 1, wherein the toolhead is one of an additive manufacturing extruder, a CNC toolhead, or a robotic arm.

6. A multi-axis motion system for a toolhead, comprising:
- a first linear rail positioned between a first drivable pulley and a second drivable pulley;
- a flexible belt positioned in contact with each of the first and second drivable pulley and positioned along a belt path of the first linear rail;
- a second linear rail positioned perpendicular to the first linear rail, wherein the first linear rail is moveable along at least a portion of a length of the second linear rail; and
- a toolhead attached to an end portion of the first linear rail, wherein the toolhead is rotatable about a first axis, wherein the first axis is formed substantially perpendicular to an elongated axis of the first linear rail and the second linear rail, wherein a rotation of the toolhead about the first axis and translational movement of the first linear rail along the elongated axis is controlled by activation of one of the first and second drivable pulley.

7. The system of claim 6, wherein translational movement of the first linear rail along the elongated axis is controlled by activation of at least one of the first and second drivable pulley.

8. The system of claim 7, wherein the translational movement of the linear rail along the elongated axis is controlled by activation of both of the first and second drivable pullies, wherein both of the first and second drivable pullies rotate in opposite rotational directions.

9. The system of claim 6, wherein the toolhead is one of an additive manufacturing extruder, a CNC toolhead, or a robotic arm.

10. The system of claim 6, wherein the first linear rail maintains a perpendicular orientation to an elongated path of the second linear rail.

11. The system of claim 6, further comprising a base plate rotatable about a second axis, wherein the second axis is substantially parallel to an elongated path of the second linear rail.

12. The system of claim 2, further comprising a second linear rail positioned perpendicular to the linear rail, wherein the linear rail is movable along at least a portion of a length of the second linear rail.

13. The system of claim 2, wherein the toolhead is one of an additive manufacturing extruder, a CNC toolhead, or a robotic arm.

* * * * *